(12) United States Patent
Tamura et al.

(10) Patent No.: US 11,937,225 B2
(45) Date of Patent: *Mar. 19, 2024

(54) DUAL CONNECTIVITY COMMUNICATION TERMINAL, BASE STATION, AND COMMUNICATION METHOD

(71) Applicant: NEC Corporation, Tokyo (JP)

(72) Inventors: Toshiyuki Tamura, Tokyo (JP); Naoaki Suzuki, Tokyo (JP); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 68 days.

This patent is subject to a terminal disclaimer.

(21) Appl. No.: 17/692,402

(22) Filed: Mar. 11, 2022

(65) Prior Publication Data

US 2022/0201685 A1 Jun. 23, 2022

Related U.S. Application Data

(63) Continuation of application No. 16/637,089, filed as application No. PCT/JP2018/029676 on Aug. 7, 2018, now Pat. No. 11,277,837.

(30) Foreign Application Priority Data

Aug. 9, 2017 (JP) ................................ 2017-154391

(51) Int. Cl.
*H04L 12/28* (2006.01)
*H04W 72/0453* (2023.01)
(Continued)

(52) U.S. Cl.
CPC ....... *H04W 72/0453* (2013.01); *H04W 76/15* (2018.02)

(58) Field of Classification Search
CPC . H04W 76/15; H04W 72/0453; H04W 88/06; H04W 28/0865; H04W 48/16; H04W 60/00
(Continued)

(56) References Cited

U.S. PATENT DOCUMENTS 11,160,083 B2 * 10/2021 Xu .................... H04W 76/27
2013/0059579 A1 3/2013 Uno et al.
(Continued)

FOREIGN PATENT DOCUMENTS

WO 2011/125697 A1 10/2011
WO 2017/119247 A1 7/2017

OTHER PUBLICATIONS

JP Office Action for JP Application No. 2021-193256, dated Jan. 24, 2023 with English Translation.
(Continued)

*Primary Examiner* — John Pezzlo
(74) *Attorney, Agent, or Firm* — Sughrue Mion, PLLC

(57) ABSTRACT

A communication terminal capable of determining whether or not it can perform DC, a base station, and a communication method are provided. A communication terminal (30) according to the present disclosure includes a communication unit (31) that simultaneously communicates with a master base station (10) associated with a first radio access technology and a secondary base station (20) associated with a second radio access technology, and a control unit (32) that specifies, when it is notified by the master base station (10) that it can provide dual connectivity using the second radio access technology, at least one frequency band supported by the secondary base station (20), the secondary base station being configured to provide the dual connectivity in cooperation with the master base station (10).

14 Claims, 11 Drawing Sheets

(51) Int. Cl.
*H04W 76/15* (2018.01)
*H04J 1/16* (2006.01)

(58) Field of Classification Search
USPC .......................................... 370/252, 329, 430
See application file for complete search history.

(56) References Cited

U.S. PATENT DOCUMENTS

| | | | |
|---|---|---|---|
| 2017/0084891 A1 | 3/2017 | Kubota et al. | |
| 2018/0049214 A1* | 2/2018 | Kubota | H04W 72/1268 |
| 2018/0227960 A1* | 8/2018 | Belghoul | H04L 1/1854 |
| 2018/0332603 A1 | 11/2018 | Takeda | H04L 5/14 |
| 2019/0098611 A1* | 3/2019 | Shimezawa | H04W 72/23 |
| 2019/0349822 A1 | 11/2019 | Kim | H04W 76/10 |
| 2020/0120472 A1 | 4/2020 | Mochizuki | H04W 16/32 |

OTHER PUBLICATIONS

ZTE, ZTE Microelectronics, "Consideration on the capability coordination for LTE/NR tight interworking", 3GPP TSG RAN WG2 #97bis, R2-1702833, Apr. 7, 2017, pp. 1-6.
3GPP TS 37.340, V.2.0, "3rd Generation Partnership Project; Technical Specification Group Radio Access Network; Evolved Universal Terrestrial Radio Access (E-UTRA) and NR; Multi-connectivity: Stage 2 (Release 15)." Jun. 2017. pp. 1.43.
SA WG2. "LS on NR indication," SA WG2 Meeting #122. S2-175270, Jun. 26-30, 2017, 1 page.
Qualcomm Incorporated, "Indication NR is available to use," 3GPP TSG-SA WG2 Meeting #122, S2-175269. Jun. 26-30, 2017, 36 pages.
Vodafone Group, "X2 Signalling for Energy Efficiency of NR Node Transmitter" 3GPP TSG-RAN WG3 97, R3-172670, Aug. 21-25, 2017, pp. 1-11.
International Search Report of PCT/JP2018/029676 dated Nov. 6, 2018.
SA WG2, "LS on Status Icons related to 5G", 3GPP TSG-SA WG2 Meeting #122, June 26-30. 2017, S2-175303, total 2 pages.
Qualcomm Incorporated et al., "NR available indicator for NR Non-Standalone architecture (option 3/7)" 3GPP SA WG2 Meeting#122, Jun. 26-30, 2017, S2-174465, total 10 cages.
Qualcomm Incorporated et al. "Indication NR is available to use", 3GPP TSG-SA WG2 Meeting #122, Jun. 26-30, 2017, S2-175082, total 35 pages.
Vodafone Group. "NR Node's Power Efficiency", 3GPP TSG RAN WG3 #97. Aug. 21-25, 2017, R3-172671, total 3 pages.
3GPP, "3rd Generation Partnership Project: Technical Specification Group Services and System Aspects; General Packet Radio Service (GPRS) enhancements for Evolved Universal Terrestrial Radio Access Network (E-UTRAN) access (Release 15)", 3GPP TS 23.401, V15.0.0, Jun. 2017, total 386 pages.
Communication dated Jul. 13, 2020 from European Patent Office in EP Application No. 18843974.9.
Japanese Office Action for JP Application No. 2019-535689 dated May 11, 2021 with English Translation.
Ericsson, "System information handling in EN-DC", 3GPP TSG RAN WG2 NR#2 adhoc_2017_06_NR, R2-1706580, Jun. 29, 2017, China, pp. 1/2-2/2.

* cited by examiner

DUAL CONNECTIVITY COMMUNICATION TERMINAL, BASE STATION, AND COMMUNICATION METHOD

CROSS-REFERENCE TO RELATED APPLICATIONS

The present application is a continuation application of U.S. patent application Ser. No. 16/637,089 filed on Feb. 6, 2020, which is a National Stage Entry of international application PCT/JP2018/029676, filed on Aug. 7, 2018, which claims the benefit of priority from Japanese Patent Application 2017-154391 filed on Aug. 9, 2017, the disclosures of all of which are incorporated in their entirety by reference herein.

TECHNICAL FIELD

The present disclosure relates to a communication terminal, a base station, and a communication method.

BACKGROUND ART

As a radio communication method used by a communication terminal, LTE (Long Term Evolution) whose standards are determined under 3GPP (3rd Generation Partnership Project) has been widely used. In the 3GPP, a radio communication method called 5G has currently been studied as a radio communication method that enables communication to be performed at a higher speed and with a larger capacity than those of the LTE. The 5G may also be referred to as NR (New Radio). In the 3GPP, it has been studied to provide the NR as a radio access technology (RAT: Radio Access Technology) which constitutes DC (Dual Connectivity) with the LTE. The DC is a technology that makes it possible to provide high-speed and large-capacity communication to a UE (User Equipment) by enabling the UE to perform simultaneous communication with a plurality of base stations. The term "UE" is used as a general term for communication terminals in the 3GPP.

Note that DC using LTE and NR is operated in an eNB (Evolved Node B) forming a LTE cell and in a gNB forming an NR cell having different coverage from that of the LTE cell. The LTE cell is an example of a cell defined as a communication area in which LTE is used, and the NR cell is an example of a cell defined as a communication area in which NR is used. At the early stage of the introduction of the NR, it had been supposed that a 5G service would be provided in a communication area in which a NR cell is smaller than an LTE cell, and hence had been supposed that a communication area would be configured so that NR cells are scattered within an LTE cell. Non-patent Literature 1 discloses, in Chapter 4.2, a system configuration that is used when DC using LTE and NR is provided.

Non-patent Literature 1 discloses a system configuration in which an eNB is used as a master base station (MeNB: Master eNB) and a gNB is used as a secondary base station (SgNB: Secondary gNB). Further, Non-patent Literature 2 discloses that when a master base station can provide DC in cooperation with a secondary base station using NR, the master base station notifies a UE of information about that by using system information (SIB: System Information Block). When the UE receives information indicating that it is permitted to use NR as a secondary RAT (Radio Access Technology) from a core network apparatus through the master base station (i.e., in a cell of the master base station), the UE may use DC between the UE and the master base station and between the UE and the secondary base station.

CITATION LIST

Non Patent Literature

Non-patent Literature 1: 3GPP TS 37.340 V0.2.0 (2017-06), Chapter 4.2
Non-patent Literature 2: 3GPP S2-175270, "LS on NR indication", SA WG2 Meeting #122, 26-30 Jun. 2017

SUMMARY OF INVENTION

Technical Problem

However, there are cases where although a UE receives, from an eNB, i.e., from the master base station, information indicating that it can provide DC using a gNB as a secondary base station, and receives, from the core network, information indicating that the UE is permitted to use NR as a secondary RAT, the UE cannot perform the DC. For example, the eNB notifies the UE of the information indicating that it can provide DC using NR without taking the current position of the UE into consideration, and the core network apparatus determines whether or not the UE can use the NR without taking the current position of the UE into consideration. Therefore, the UE may receive, from the eNB, the information indicating that it can provide DC using NR and the information indicating that the UE is permitted to use the NR in a state in which the UE is located outside the communication area of the NR. In such a case, the UE cannot perform the DC. Further, for example, when the UE is in a state in which it is located within the communication area of the eNB and within the communication area of the NR, but the NR is configured to perform DC with an eNB different from the aforementioned eNB, the UE cannot perform the DC. Therefore, there is a problem that the UE cannot determine whether or not it can perform DC based solely on the information received from the eNB, which is the master base station.

An object of the present disclosure is to provide a communication terminal capable of determining whether or not it is in a state in which it can perform DC using 5G (NR), a base station that contributes thereto, and a communication method therefor.

Solution to Problem

A communication terminal according to a first aspect of the present disclosure includes: communication means for simultaneously communicating with a master base station associated with a first radio access technology and a secondary base station associated with a second radio access technology; reception means for receiving, from the master base station, information indicating that use of dual connectivity using the second radio access technology is permitted; and control means for specifying at least one frequency band supported by the secondary base station, the secondary base station being configured to provide dual connectivity in cooperation with the master base station.

A base station according to a second aspect of the present disclosure includes: communication means for communicating with a communication terminal by using a first radio access technology; and control means for transmitting, to the communication terminal, information about at least one frequency band supported by a secondary base station associated with the second radio access technology when the base station provides dual connectivity to the communication terminal in cooperation with the secondary base station.

A communication method according to a third aspect of the present disclosure is a communication method performed in a communication terminal, the communication terminal being configured to simultaneously communicate with a master base station associated with a first radio access technology and a secondary base station associated with a second radio access technology, the communication method including: receiving, from the master base station, information indicating that use of dual connectivity using the second radio access technology is permitted; and specifying at least one frequency band supported by the secondary base station, the secondary base station being configured to provide dual connectivity in cooperation with the master base station.

Advantageous Effects of Invention

According to the present disclosure, it is possible to provide a communication terminal capable of determining whether or not it is in a state in which it can perform DC using 5G (NR), a base station that contributes thereto, and a communication method therefor.

DESCRIPTION OF EMBODIMENTS

First Example Embodiment

Example embodiments according to the present disclosure will be described hereinafter with reference to the drawings. A communication system according to a first example embodiment includes a master base station 10, a secondary base station 20, and a communication terminal 30. Each of the master base station 10, the secondary base station 20, and the communication terminal 30 may be a computer apparatus that operates as a processor executes a program stored in a memory.

Figure 1:
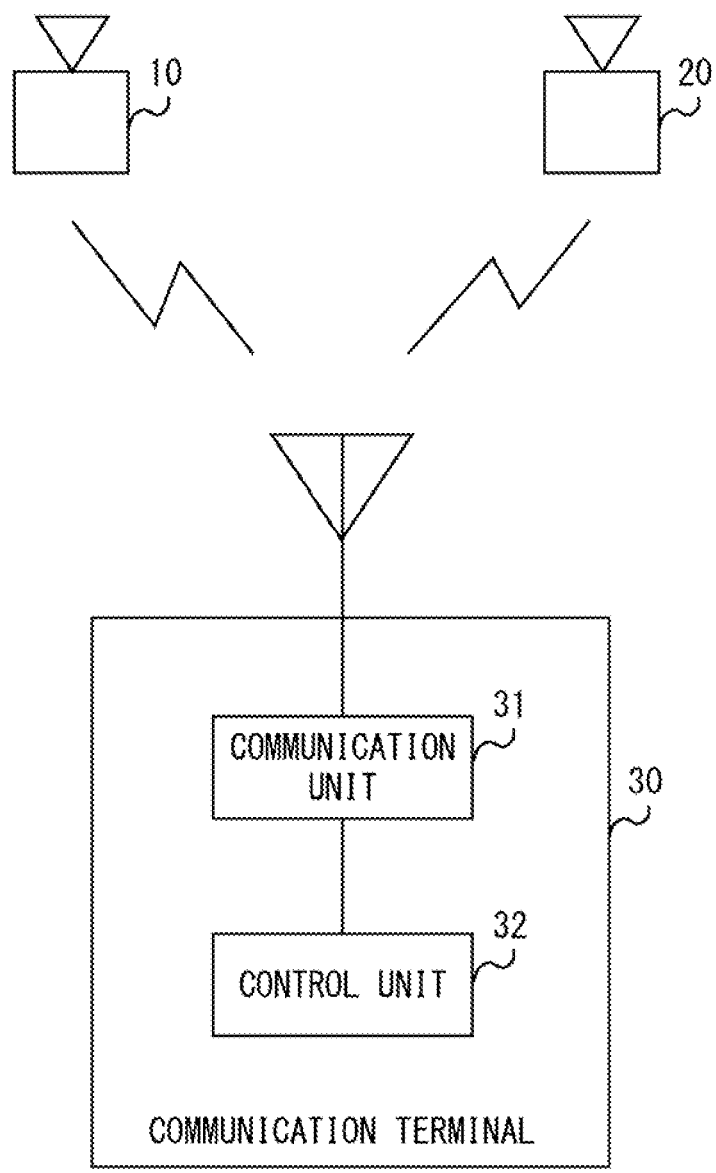
FIG. 1 is a configuration diagram of a communication system according to a first example embodiment, a first example embodiment TA, and a first example embodiment 1B.

Each of the master base station 10 and secondary base station 20 is associated with a specific radio access technology. In FIG. 1, the radio access technology associated with the master base station 10 is different from that associated with the secondary base station 20. Further, the radio access technology associated with the master base station 10 may also be expressed as a radio access technology supported by the master base station 10 (e.g., as a master RAT). Similarly, the radio access technology associated with the secondary base station 20 may also be expressed as a radio access technology supported by the secondary base station 20 (e.g., as a secondary RAT).

For example, the radio access technology associated with the master base station 10 may be LTE (the fourth generation mobile communication method) while the radio access technology associated with the secondary base station 20 may be NR (the fifth generation mobile communication method). The master base station 10 that supports LTE as its radio access technology forms a EUTRAN (Evolved Universal Terrestrial Radio Access Network). The secondary base station 20 that supports NR as its radio access technology forms an NG-RAN (Next Generation-RAN).

Next, an example of a configuration of the communication terminal 30 will be described. The communication terminal 30 includes a communication unit (Transceiver) 31 and a control unit (Controller) 32. The communication unit 31 and the control unit 32 may be software or a module(s) by which processes are performed as a processor executes a program stored in a memory. Alternatively, the communication unit 31 and the control unit 32 may be hardware such as a circuit(s) or a chip(s).

The communication unit 31 can simultaneously communicate with the master base station 10 and the secondary base station 20. For example, the communication unit 31 may perform radio communication with the master base station 10 and the secondary base station 20. The simultaneous communication includes communication in which a timing at which the communication unit 31 communicates with the master base station 10 and a timing at which the communication unit 31 communicates with the secondary base station 20 are shifted from each other by a predetermined time, i.e., includes communication processes that are performed substantially at the same timing. The communication unit 31 simultaneously communicating with the master base station 10 and the secondary base station 20 may also be expressed as the communication unit 31 performing DC with the master base station 10 and the secondary base station 20. It may also be expressed as the communication unit 31 performing DC in a communication area (a cell or the like) of the master base station 10 and in a communication area (a cell or the like) of the secondary base station 20.

The control unit 32 receives information or a notification indicating that use of DC using the radio access technology associated with the secondary base station 20 (i.e., the secondary RAT) is permitted from the master base station 10 through the communication unit 31. Further, the control unit 32 specifies at least one frequency band supported by the secondary base station 20 which can provide DC in cooperation with the master base station 10. The communication terminal 30 (the communications unit 31) may receive, directly or through a relay apparatus, information that is transmitted from the master base station 10 and indicates that the communication terminal 30 is permitted to use the DC using the secondary RAT.

For example, the control unit 32 may successively scan (or search or refer to) frequency bands that are supported as frequency bands by which the communication terminal 30 performs radio communication by using the secondary RAT (e.g., NR), and thereby specify (or detect) at least one frequency band supported by the secondary base station 20. For example, the control unit 32 may successively scan (or search or refer to) frequency bands that are supported for radio communication using the secondary RAT performed by the communication terminal 30, and specify (or detect) a frequency (band) with which the control unit 32 can receive a signal (e.g., a reference signal) transmitted from the secondary base station 20 as a frequency (band) supported by the secondary base station 20 (i.e., a frequency (band) by which radio communication using the secondary RAT is provided). Note that in the following description, "to scan" may also be expressed as "to search" or "to refer to".

As described above, when the control unit 32 shown in FIG. 1 is notified by the master base station 10 that it is permitted to use DC using the radio access technology associated with the secondary base station 20, the control unit 32 can specify at least one frequency band supported by the secondary base station 20 which provides the DC in cooperation with the master base station 10. The fact that the control unit 32 was able to specify a frequency band means that it was able to receive a radio signal transmitted from the secondary base station 20. Therefore, the control unit 32 determines that it can perform DC with the master base station 10 and the secondary base station 20 by specifying the frequency band supported by the secondary base station 20. In other words, the control unit 32 determines whether or not it can perform DC with the master base station 10 and the secondary base station 20 based on whether or not it was able to specify the frequency band supported by the secondary base station 20. Note that as the operation performed by the communication terminal 30 in the above description, the communication terminal 30 specifies the frequency band supported by the secondary base station 20. However, the operation is not limited to specifying the frequency. For example, instead of specifying the frequency band supported by the secondary base station 20, the communication terminal 30 may operate so as to detect (or select) a cell managed by the secondary base station 20. In the following description, it is assumed that the operation performed by the communication terminal 30 may be any of these operations.

First Example Embodiment 1A

FIG. 1 shows that the communication terminal 30 is in a state in which it is located in the communication area of the master base station 10 and in the communication area of the secondary base station 20. However, when the secondary base station 20 is configured to perform DC in cooperation with a master base station different from the master base station 10, the master base station 10 cannot perform DC using the secondary base station 20. A first method by which the communication terminal 30 specifies (or detects) this situation and determines whether or not it can perform DC using the secondary RAT will be described hereinafter.

When the master base station 10 notifies the communication terminal 30 that it can provide DC using the radio access technology associated with the secondary base station 20 (i.e., the secondary RAT) (by using broadcast information or an individual signal), the master base station notifies the communication terminal 30 of identification information A for identifying the secondary base station 20 which provides the DC in cooperation with the master base station 10. Note that the information indicating that it is possible to provide DC using the secondary RAT may be broadcasted by using an SIB(s), or may be transmitted to each communication terminal 30 by using an individual signal (UE dedicated signaling). The individual signal may be, for example, RRC signaling (e.g., an RRC Connection Reconfiguration Message) or MAC signaling (e.g., a MAC Control Element (CE)). For example, the identification information A may be an identifier of the secondary base station 20 (e.g., a Node B identity). The identification information A may be identification information for identifying a communication area (a cell or the like) provided by the secondary base station 20. For example, the identification information A may be an identifier of a cell managed by the secondary base station 20 (e.g., a PCI (Physical Cell Identifier), a Cell Identity, or a CGI (Cell Global Identifier, Cell identity+PLMN Identity)). They may be managed by the secondary base station 20, and may be limited to those corresponding to communication areas (cells and the like) provided by the secondary base station 20 which can provide DC in cooperation with the master base station 10. Additionally or alternatively, the identification information A may be an identifier of a location management area at a RAN level to which a cell(s) managed by the secondary base station 20 belongs (e.g., a RAN Notification Area (RNA) Identity and a RAN Location Area (RLA) Identity). By using the identifier of the location management area at the RAN level instead of using the identifier of the cell, it is expected that the amount of information that is sent from the master base station 10 to the communication terminal 30 is reduced. Note that when there are a plurality of base stations or a plurality of communication areas (cells and the like) of which the communication terminal 30 is to be notified, the communication terminal 30 may be notified of a list of a plurality of identification information pieces A.

When the communication terminal 30 specifies (or detects) at least one frequency band supported by the secondary base station 20 which provides DC in cooperation with the master base station 10, the secondary base station 20 notifies the communication terminal 30 of identification information B for identifying the secondary base station 20 itself. For example, the identification information B may be an identifier of the secondary base station 20 (e.g., a Node B identity). The identification information B may be identification information for identifying a communication area (a cell or the like) provided by the secondary base station 20 itself. For example, the identification information B may be an identifier of a cell managed by the secondary base station 20 (e.g., a PCI, a Cell Identity, or a CGI). They may be managed by the secondary base station 20, and may be limited to those corresponding to communication areas (cells and the like) provided by the secondary base station 20 which can provide DC in cooperation with the master base station 10. Note that instead of notifying the communication terminal 30 of the PCI as explicit information, the communication terminal 30 may be implicitly notified of the PCI by detecting a signal (e.g., a reference signal (Reference Signal: RS) or a Synchronization Signal) transmitted from the secondary base station 20. Note that when there are a plurality of base stations or a plurality of communication areas (cells and the like) of which the communication terminal 30 is to be notified, the communication terminal 30 may be notified of a list of a plurality of identification information pieces B. For example, when the communication terminal 30 performs radio communication by using the secondary RAT, the secondary base station 20 notifies the communication terminal 30 of the identification information B by including it in a signal (e.g., broadcast information) that is transmitted in preparation for successive scanning of frequency bands of the secondary RAT supported by the communication terminal 30.

The communication terminal 30 stores the identification information A sent from the master base station 10. Meanwhile, when the communication terminal 30 is notified of the identification information B by the secondary base station 20, the communication terminal 30 checks whether or not the identification information B is included in the identification information A and determines whether or not it can perform DC with the master base station 10 and the secondary base station 20 based on whether or not the identification information B is included in the identification information A. For example, when at least one identification information piece B is included in the identification information A, the communication terminal 30 determines that it can perform the DC. When the identification information B is included in the identification information A, the communication terminal 30 specifies at least one frequency band supported by the secondary base station 20 which provides DC in cooperation with the master base station 10.

First Example Embodiment 1B

FIG. 1 shows that the communication terminal 30 is in a state in which it is located in the communication area of the master base station 10 and in the communication area of the secondary base station 20. However, when the secondary base station 20 is configured to perform DC in cooperation with a master base station different from the master base station 10, the master base station 10 cannot perform DC using the secondary base station 20. A second method by which the communication terminal 30 specifies (or detects) this situation and determines whether or not it can perform DC using the secondary RAT will be described hereinafter.

A case in which the communication terminal 30 specifies (or detects) at least one frequency band supported by the secondary base station 20 capable of providing DC in cooperation with the master base station 10 will be described. In this case, the secondary base station 20 notifies the communication terminal 30 of identification information C for identifying the master base station 10 capable of providing DC by using the secondary base station 20 (i.e., in cooperation with the secondary base station 20). In other words, the secondary base station 20 transmits information that is necessary for the communication terminal 30 to specify (detect) a cell of the secondary base station 20, and further transmits identification information C for identifying the master base station 10 in that cell. The identification information C may be identification information for identifying a communication area (a cell or the like) provided by the master base station 10. For example, the identification information C may be an identifier of a cell managed by the master base station 10 (e.g., a PCI, a Cell Identity, or a CGI). They may be managed by the master base station 10, and may be limited to those corresponding to communication areas (cells and the like) provided by the master base station 10 which can provide DC in cooperation with the secondary base station 20. Note that when there are a plurality of base stations or a plurality of communication areas (cells and the like) of which the communication terminal 30 is to be notified, the communication terminal 30 may be notified of a list of a plurality of identification information pieces C. For example, the secondary base station 20 notifies the communication terminal 30 of the identification information C by including it in a signal that is transmitted in preparation for successive scanning of frequency bands that are supported for radio communication performed by the communication terminal 30.

In the communication area of the master base station 10, the communication terminal 30 has knowledge about identification information for identifying the master base station 10 to which the communication terminal 30 currently belongs (or the communication area (a cell or the like) of the master base station 10 in which the communication terminal 30 is located). When the communication terminal 20 is notified of the identification information C by the secondary base station 20, the communication terminal 30 checks whether or not the master base station 10 to which the communication terminal 30 currently belongs (or the communication area (a cell or the like) of the master base station 10 in which the communication terminal 30 is located) is included in the identification information C. The communication terminal 30 determines whether or not it can perform DC with the master base station 10 to which the communication terminal 30 currently belongs and the secondary base station 20 based on whether or not the master base station 10 is included in the identification information C. For example, when the communication area (a cell or the like) of the master base station 10 to which the communication terminal 30 currently belongs is included in the identification information C, the communication terminal 30 determines that it can perform the DC. When the master base station 10 to which the communication terminal 30 currently belongs (or the communication area (a cell or the like) of the master base station 10 in which the communication terminal 30 is located) is included in the identification information C, the communication terminal 30 specifies at least one frequency band supported by the secondary base station 20 which provides DC in cooperation with the master base station 10.

Second Example Embodiment

Figure 2:
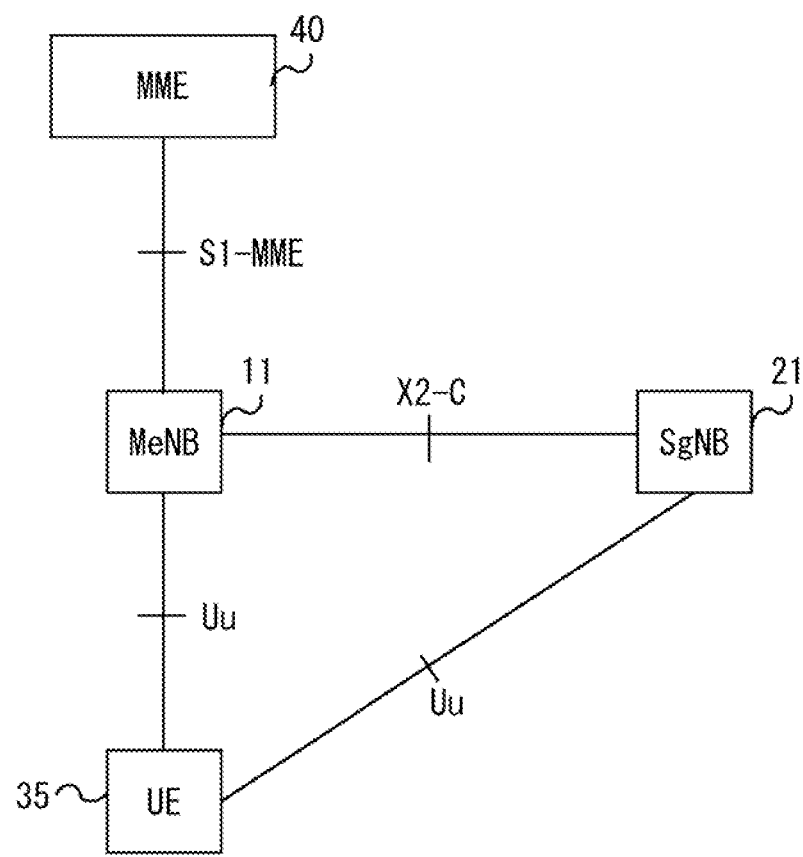
FIG. 2 is a configuration diagram of a communication system according to a second example embodiment.

Next, an example of a configuration of a communication system according to a second example embodiment will be described with reference to FIG. 2. FIG. 2 shows a C-Plane (Control-Plane) architecture that is used when DC is provided to a UE 35. The C-Plane architecture shows a configuration of a communication system that is used to transmit traffic related to a C-Plane. The DC provided to the UE 35 by using the configuration shown in FIG. 2 may be referred to as EN-DC (EUTRA (Evolved Universal Terrestrial Radio Access) NR DC).

The communication system shown in FIG. 2 includes an MeNB (Master Evolved Node B) 11, an SgNB (Secondary g Node B) 21, the UE 35, and an MME (Mobility Management Entity) 40. The MME 40 is a core network apparatus or a core network node forming an EPC (Evolved Packet Core). The MME 40 mainly manages and controls mobility of the UE 35.

The UE 35 corresponds to the communication terminal 30 shown in FIG. 1. The term "UE" is used as a general term for communication terminals in the 3GPP.

The MeNB 11 corresponds to the master base station 10 shown in FIG. 1. The MeNB 11 is a base station that supports LTE as its radio access technology. The SgNB 21 corresponds to the secondary base station 20 shown in FIG. 1. The SgNB 21 is a base station that supports NR as its radio access technology.

A Uu is defined as a reference point between the UE 35 and the MeNB 11. A Uu is defined as a reference point between the UE 35 and the SgNB 21. An X2-C is defined as a reference point between the MeNB 11 and the SgNB 21. An S1-MME is defined as a reference point between the MeNB 11 and the MME 40.

Next, communication areas formed by the MeNB 11 and the SgNB 21 will be described with reference to FIG. 3. A communication area A_1 in FIG. 3 indicates a communication area (e.g., a cell A_1) formed by the MeNB 11. That is, in the communication area A_1, radio communication is performed by using LTE.

Figure 3:
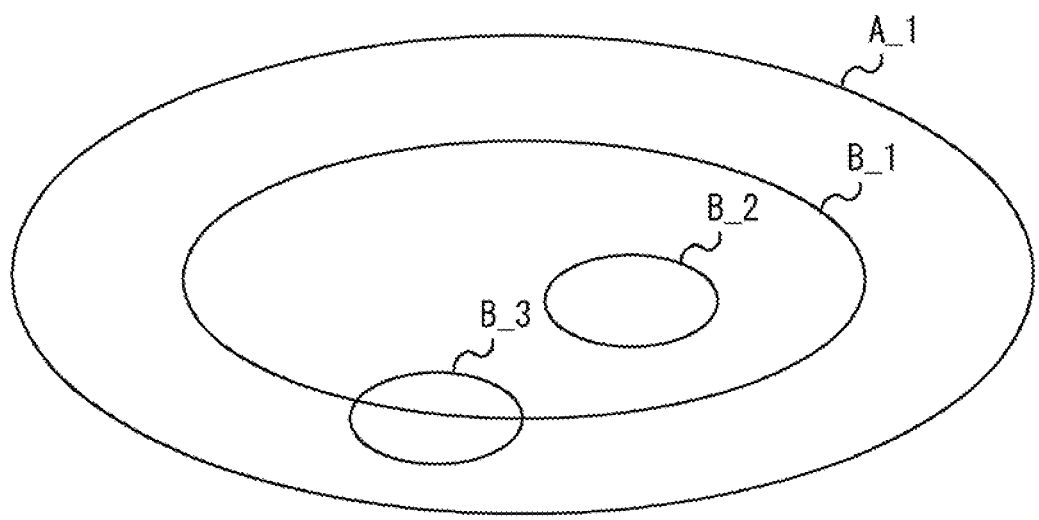
FIG. 3 is a diagram for explaining communication areas formed by an MeNB and an SgNB according to the second example embodiment.

A communication area B_1 in FIG. 3 indicates a communication area (e.g., a cell B_1) formed by the SgNB 21. In the communication area B_1, radio communication is performed by using NR. Note that the SgNB 21 can perform radio communication with a UE by using a frequency band C_1 in the communication area B_1. A communication area B_2 in FIG. 3 indicates a communication area (e.g., a cell B_2) formed by the SgNB 21_1 (which is not shown in FIG. 2). In the communication area B_2, radio communication is performed by using NR. Note that the SgNB 211, which forms the communication area B_2, can perform radio communication with a UE by using a frequency band C_2. Similarly to the communication area B_2, the communication area B_3 shown in FIG. 3 indicates a communication area (e.g., a cell B_3) formed by the SgNB 21_2 (which is not shown in FIG. 2). Note that the SgNB 212, which forms the communication area B_3, can perform radio communication with a UE by using a frequency band C_3.

As shown in FIG. 3, the communication area B_1 (e.g., the cell B_1), the communication area B_2 (e.g., the cell B_2), and the communication area B_3 (e.g., the cell B_3) are included in the communication area A_1 (e.g., the cell A_1). Further, the communication area B_2 is included in the communication area B_1 and a part of the communication area B_3 is included in the communication area B_1. In the following description, each communication area will be described as a cell. However, the descriptions in this example embodiment can also be applied to communication areas that are defined by other methods.

For example, when the UE 35 supports the frequency band C_1 as a frequency band by which it performs communication using NR, the MeNB 11 can provide DC to the UE 35 located in the cell B_1 in cooperation with the SgNB 21. In other words, when the UE 35 is located in the cell B_1, it can perform DC in the cell A_1 of the MeNB 11 and in the cell B_1 of the SgNB 21. Further, when a UE that supports the frequency band C_2 as a frequency band by which it performs communication using NR is located in the cell B_2, the UE can perform DC in the cell A_1 of the MeNB 11 and in the cell B_2 of the SgNB 21_1 (which is not shown in FIG. 3).

Figure 4:
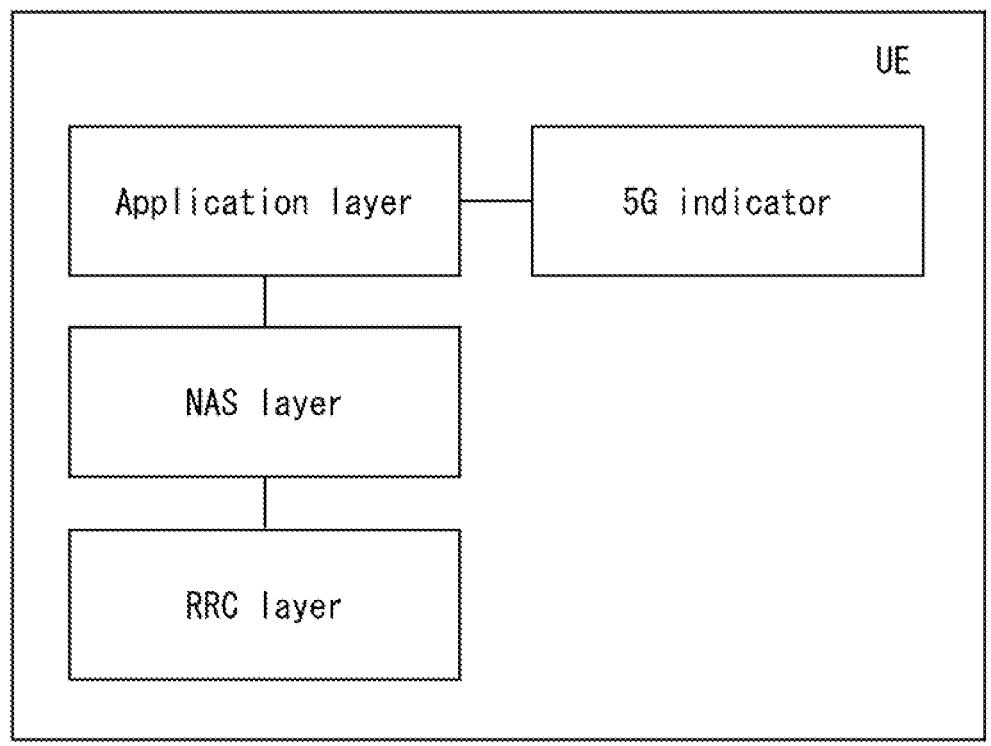
FIG. 4 shows a diagram for explaining a layer structure in a UE according to the second example embodiment.

Next, a layer structure in the UE 35 will be described with reference to FIG. 4. The description of the layer structure may be replaced by a description of a protocol stack. The UE 35 mainly includes an RRC (Radio Resource Control) layer, a NAS (Non Access Stratum) layer, and an Application layer. The UE 35 may include a processor that performs processes for each layer. Alternatively, one processor may perform processes in at least two of the RRC layer, the NAS layer, and the application layer. Note that the RRC layer is an example of a layer included in an AS layer and the RRC layer may be replaced by the AS layer.

In the RRC layer, the processor performs processes using an RRC protocol that is defined between the UE 35 and the MeNB 11, and between the UE 35 and the SgNB 21. After performing a process in the RRC layer, the processor sends (indicates) or transfers (forwards) an execution result or data used for a process in an Upper layer from the RRC layer to the Upper layer. For example, the processor outputs the execution result in the RRC layer from the RRC layer to the NAS layer, which is the Upper layer. The Upper layer may also be referred to as a Higher layer. Note that the signal processing in the RRC layer is divided into signal processing in an LTE cell of the MeNB 11 (i.e., LTE RRC processing) and signal processing in an NR cell of the SgNB 21 (i.e., NR RRC processing). Note that two independent (individual) layers may exist as the RRC layer. Alternatively, one layer (e.g., an LTE RRC layer) may exist as the RRC layer and a part of it may serve as the other layer (e.g., the NR RRC layer). Note that information may be exchanged as appropriate between the LTE RRC and the NR RRC.

In the NAS layer, the processor performs processes by using a NAS protocol that is defined between the UE 35 and the MME 40. After performing a process in the NAS layer, the processor outputs an execution result of the process in the NAS layer or data used for a process in the Application layer from the NAS layer to the Application layer. Alternatively, after performing a process in the NAS layer, the processor outputs an execution result of the process in the NAS layer, or data or control information used for a process in the RRC layer from the NAS layer to the RRC layer.

A 5G indicator Application is described as an application in which a process in the Application layer is performed. When it is determined (or decided) that the UE 35 can perform DC using LTE and NR, the 5G indicator Application displays information indicating that a 5G (NR) system can be used (hereinafter referred to as a 5G indicator) in a display unit such as a display of the UE 35. Further, when it is determined (or decided) that the UE 35 cannot perform DC using LTE and NR, the 5G indicator Application displays information indicating that a 5G (NR) system cannot be used (hereinafter referred to as a 5G indicator) in the display unit such as the display of the UE 35. Alternatively, when it is determined (or decided) that the UE 35 cannot perform DC using LTE and NR, the 5G indicator Application stops displaying information indicating that a 5G (NR) system can be used (hereinafter referred to as a 5G indicator). For example, the 5G indicator Application may display letters "5G" as the 5G indicator in the display unit.

For example, when there is no restriction that prevents the UE 35 from using NR and the UE 35 has succeeded in specifying (or detecting) a frequency band that is used for communication using NR, the 5G indicator Application may display the 5G indicator in the display unit. Alternatively, when the UE 35 receives, from the MeNB 11, information indicating that the MeNB 11 can support dual connectivity using locally-available NR and the UE 35 has succeeded in specifying (or detecting) a frequency band that is used for communication using NR, the 5G indicator Application may display the 5G indicator in the display unit. Here, it is assumed that the communication area in which LTE can be used is sufficiently widespread and, as shown in FIG. 3, the communication area in which communication using NR can be performed is included in the communication area in which communication using LTE can be performed.

Note that the information indicating that there is no restriction that prevents the UE 35 from using NR may be included in a NAS message that is terminated in the NAS layer. Upon receiving the NAS message from the MeNB 11, the UE 35 may extract information indicating that there is no restriction that prevents the UE 35 from using NR in the NAS layer and output the extracted information to the Application layer. Alternatively, when the UE 35 extracts this information in the NAS layer and is notified from the RRC layer that a frequency that is used for communication using NR has been successfully specified (or detected), it may output information indicating that the 5G (NR) system is available to the Application layer. The information indicating that there is no restriction that prevents the UE 35 from using NR may be included, for example, in an ATTACH Accept message as information indicating that use of NR as the secondary RAT is permitted (i.e., as NR availability). The ATTACH Accept message is transmitted from the MME 40 through the MeNB 11 during an ATTACH process. Alternatively, information indicating that there is no restriction that prevents the UE 35 from using NR may be included, for example, in a TAU accept message as information indicating that use of NR as the secondary RAT is permitted (i.e., as NR availability). The TAU accept message is transmitted from the MME 40 through the MeNB 11 during a TAU process. That is, when the UE 35 receives the ATTACH Accept message or the TAU Accept message including the aforementioned information, the UE 35 recognizes that there is no restriction that prevents the UE 35 from using NR. Note that the NR availability may also be referred to as NR authorization, NR permission, or NR allowance.

Figure 5:
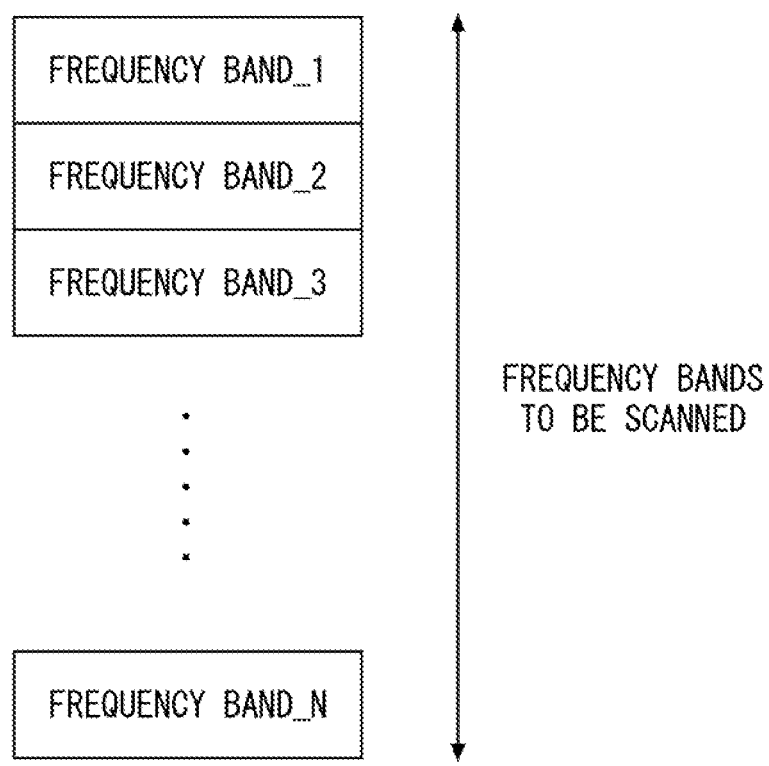
FIG. 5 is a diagram for explaining a process for specifying a frequency band according to the second example embodiment.

A process for specifying (or detecting) a frequency band that is used for communication using NR will be described with reference to FIG. 5. For example, the UE 35 may hold in advance information about a list of frequency bands that the UE 35 supports as frequency bands that can be used for communication using NR. FIG. 5 shows a list of frequency bands that the UE 35 supports as frequency bands that can be used for communication using NR. FIG. 5 shows that the UE 35 supports a frequency band_1 to a frequency band_N (N is an integer equal to or greater than one) as frequency bands that can be used for communication using NR. The frequency bands_1 to _N correspond to specific frequency bands such as a 2 GHz band and a 5 GHz band.

The processor that performs a process related to the RRC layer scans the frequency bands_1 to _N and thereby specifies (or detects) a frequency band that can be used for communication using NR. For example, the processor that performs a process related to the RRC layer may specify, as the frequency band that can be used for the communication using NR, a frequency band by which it has succeeded in normally receiving a pilot signal, a reference signal, a synchronization signal, broadcast information, or the like.

After the UE 35 has received the NR availability, the processor that performs the process related to the RRC layer may scan the frequency bands_1 to _N and thereby specify (or detect) a frequency band that can be used for communication using NR. For example, when it is confirmed that the NR availability has been received in the NAS layer, information instructing to scan frequency bands that can be used for communication using NR, supported by the UE 35 may be output from the NAS layer to the RRC layer. Further, this information may include information that explicitly indicates the frequency bands to be scanned (e.g., the frequency bands_1 to _N). In the process in the RRC layer, when the processor specifies (or detects) a frequency band that can be used for communication using NR, it may output, to the NAS layer, information indicating the specified (or detected) frequency band or information indicating that a frequency band that can be used for communication using NR has been specified (or detected) (hereinafter referred to as NR specifying information). Alternatively, the processor may output this NR specifying information to the Application layer through the NAS layer.

When the 5G indicator Application has successfully confirmed the NR availability and the NR specifying information in the Application layer, it displays the 5G indicator in the display unit. Alternatively, when the 5G indicator Application has successfully confirmed, in the Application layer, the information that is sent from the NAS layer and indicates that the 5G (NR) system is available, it displays the 5G indicator in the display unit.

As described above, when the UE 35 according to the second example embodiment receives, from the MME 40 through the MeNB 11, information indicating that use of NR as the secondary RAT is permitted (i.e., the NR availability), the UE 35 performs a process for specifying a frequency band that can be used for communication using NR. When the UE 35 has succeeded in specifying the frequency band that can be used for communication using NR, it means that the UE 35 can communicate with the SgNB that supports the NR. Therefore, the UE 35 can determine that it can perform DC using LTE and NR in the current position of the UE 35 (or recognizes that it can perform the DC) by receiving the NR availability and specifying a frequency band that can be used for communication using NR.

Further, when the UE 35 determines that it can perform DC using LTE and NR, it displays the 5G indicator in the display unit. For example, in the case where the UE 35 displays the 5G indicator in the display unit upon receiving information indicating that use of NR as the secondary RAT is permitted (i.e., the NR availability), if the UE 35 is located outside the communication area of the NR, it actually cannot perform DC using LTE and NR. That is, in the case where the UE 35 displays the 5G indicator in the display unit upon receiving the NR availability, the UE 35 may display the 5G indicator in the display unit even when it actually cannot perform DC using LTE and NR.

In contrast, in the present disclosure, when the UE 35 receives the NR availability and has succeeded in specifying (or detecting) a frequency band that can be used for communication using NR, the UE 35 recognizes that it can perform DC using LTE and NR (or it is in state in which it can perform the DC). In such a case, by displaying the 5G indicator in the display unit, the UE 35 can notify a user using the UE 35 of accurate information as to whether or not the 5G (NR) system is available.

Third Example Embodiment

Figure 6:
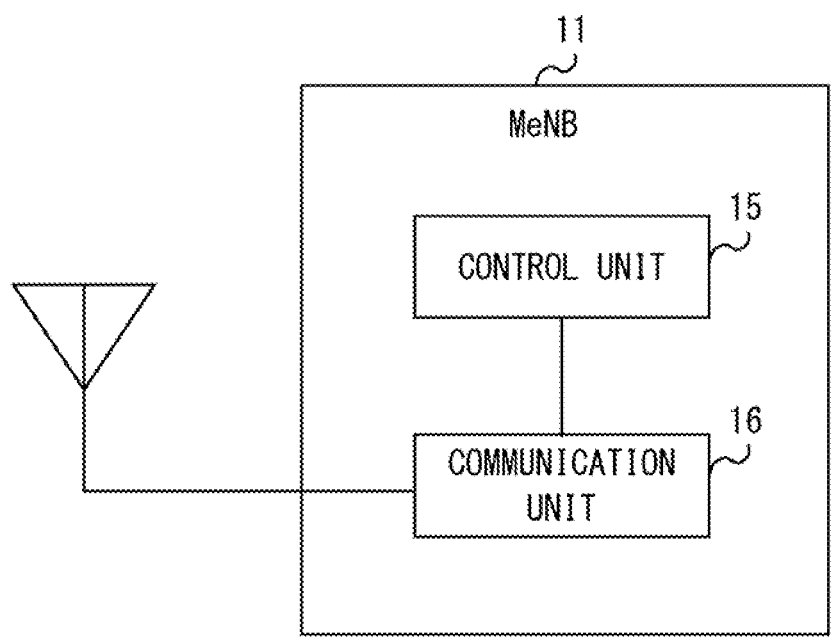
FIG. 6 is a configuration diagram of an MeNB according to a third example embodiment.

Next, an example of a configuration of an MeNB 11 according to a third example embodiment will be described with reference to FIG. 6. The MeNB 11 includes a control unit 15 and a communication unit 16. The control unit 15 and the communication unit 16 may be software or a module(s) by which processes are performed as a processor executes a program stored in a memory. Alternatively, the control unit 15 and the communication unit 16 may be hardware such as a circuit(s) or a chip(s).

The communication unit 16 performs radio communication with the UE 35 by using LTE. For example, the communication unit 16 transmits broadcast information to at least one UE located in a communication area formed by the MeNB 11. Transmitting broadcast information may also be expressed as broadcasting broadcast information.

The control unit 15 determines information or a parameter(s) included in the broadcast information. The control unit 15 includes information about frequency bands supported by the SgNB 21 which provides DC in cooperation with the MeNB 11 in the broadcast information. For example, the control unit 15 may include information about the frequency bands supported by the SgNB 21 which provides DC in cooperation with the MeNB 11 in an SIB(s) (System Information Block(s)) that is transmitted as the broadcast information. Further, the control unit 15 may include, in the broadcast information, information about frequency bands supported by an SgNB which provides DC in cooperation with the MeNB 11 but is different from the SgNB 21. That is, the control unit 15 may include, in the broadcast information (e.g., the SIB), information about frequency bands supported by each of a plurality of SgNBs each of which can provide DC in cooperation with the MeNB 11.

Further, the control unit 15 may determine, for each PLMN (Public Land Mobile Network), whether or not to include information about frequency bands supported by the SgNB 21 which provides DC in cooperation with the MeNB 11 in the broadcast information (e.g., the SIB).

The information about frequency bands supported by the SgNB which can provide DC in cooperation with the MeNB 11 may be determined in advance and stored in a memory or the like disposed inside the MeNB 11.

The control unit 15 may show the information about frequency bands supported by the SgNB 21 which provides DC in cooperation with MeNB 11 in the form of a list of frequency band identifiers (FBIs (Frequency Band Indicators)) or a list of carrier frequencies. The carrier frequency may be indicated by a frequency number defined in advance in the specifications (e.g., an ARFCN (Absolute Radio Frequency Channel Number)). Alternatively, regarding the information about frequency bands supported by the SgNB 21 which provides DC in cooperation with the MeNB 11, the control unit 15 may explicitly indicate a combination of a frequency band or a carrier frequency supported by the SgNB 21 which provides DC in cooperation with the MeNB 11 and a frequency band (e g., an FBI) or a carrier frequency of a serving cell that the MeNB 11 uses for communication with the UE, or may implicitly indicate the combination by using an Index value corresponding to that combination. Note that the combination of frequency bands and the combination of carrier frequencies may be defined in advance as a Band Combination (BC) and a Carrier Frequency Combination (e.g. a CFC or a FC) in the specifications, or sent from the MeNB 11 to the UE 35 by using a control signal (e.g., RRC signaling). Similarly, a method for determining the index value may be defined in advance in the specifications or sent from the MeNB 11 to the UE 35 by using a control signal. Further, the control unit 15 may include the above-described list or the Index value in the broadcast information (e.g., the SIB). Note that the above-described frequency bands supported by the SgNB 21 may be frequency bands that are supported by the SgNB 21 and by which the SgNB 21 can provide DC in cooperation with the MeNB 11. Alternatively, the frequency bands supported by the SgNB 21 may be frequency bands that are supported by the SgNB 21 and by which the SgNB 21 is currently providing DC in cooperation with the MeNB 11.

Next, a process for specifying (or detecting) a frequency band (or a carrier frequency) that can be used for communication using NR in the UE 35 is described. Upon receiving the broadcast information from the MeNB 11, the UE 35 extracts information about the frequency bands supported by the SgNB 21 which provides DC in cooperation with the MeNB 11.

The process for extracting the information about the frequency bands supported by SgNB 21 which provides DC in cooperation with MeNB 11 may be performed in, for example, the RRC layer. When the UE 35 specifies (detects) a frequency band (or a carrier frequency) that is used for communication using NR, it scans frequency bands (or carrier frequencies) that are included in one or a plurality of frequency bands (or carrier frequencies) that the UE 35 supports as frequency bands (or carrier frequencies) that can be used for communication using NR and are also included in frequency bands (or the carrier frequencies) supported by the SgNB 21 which provides DC in cooperation with the MeNB 11.

Figure 7:
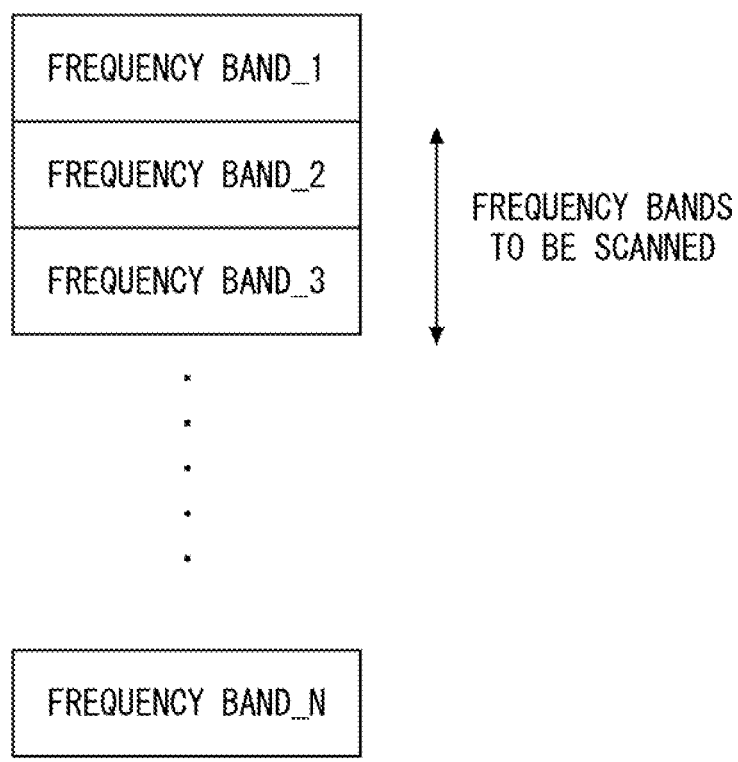
FIG. 7 is a diagram for explaining a process for specifying a frequency band according to the third example embodiment.

FIG. 7 shows that the frequency bands (or the carrier frequencies) to be scanned in the UE 35 among the frequency bands (or the carrier frequencies) that the UE 35 can use for communication using NR are a frequency band_2 and a frequency band_3. The UE 35 scans the frequency bands_2 and _3, and thereby specifies (or detects) a frequency band (or a carrier frequency) that can be used for communication using NR.

As described above, the MeNB 11 according to the third example embodiment can broadcast, to at least one UE, broadcast information including information about frequency bands supported by the SgNB which can provide DC in cooperation with the MeNB 11.

The UE 35 does not scan all the frequency bands that the UE 35 supports as the frequency bands that are used for communication using NR, but does scan the frequency bands that are also included in the frequency bands supported by the SgNB 21 which provides DC in cooperation with MeNB 11. In this way, the number of frequency bands to be scanned in the UE 35 is reduced as compared with the case in which the UE 35 scans all the frequency bands that are supported as the frequency bands used for communication using NR. As a result, it is possible to reduce the power consumption related to the process for scanning the frequency bands.

Fourth Example Embodiment

Figure 8:
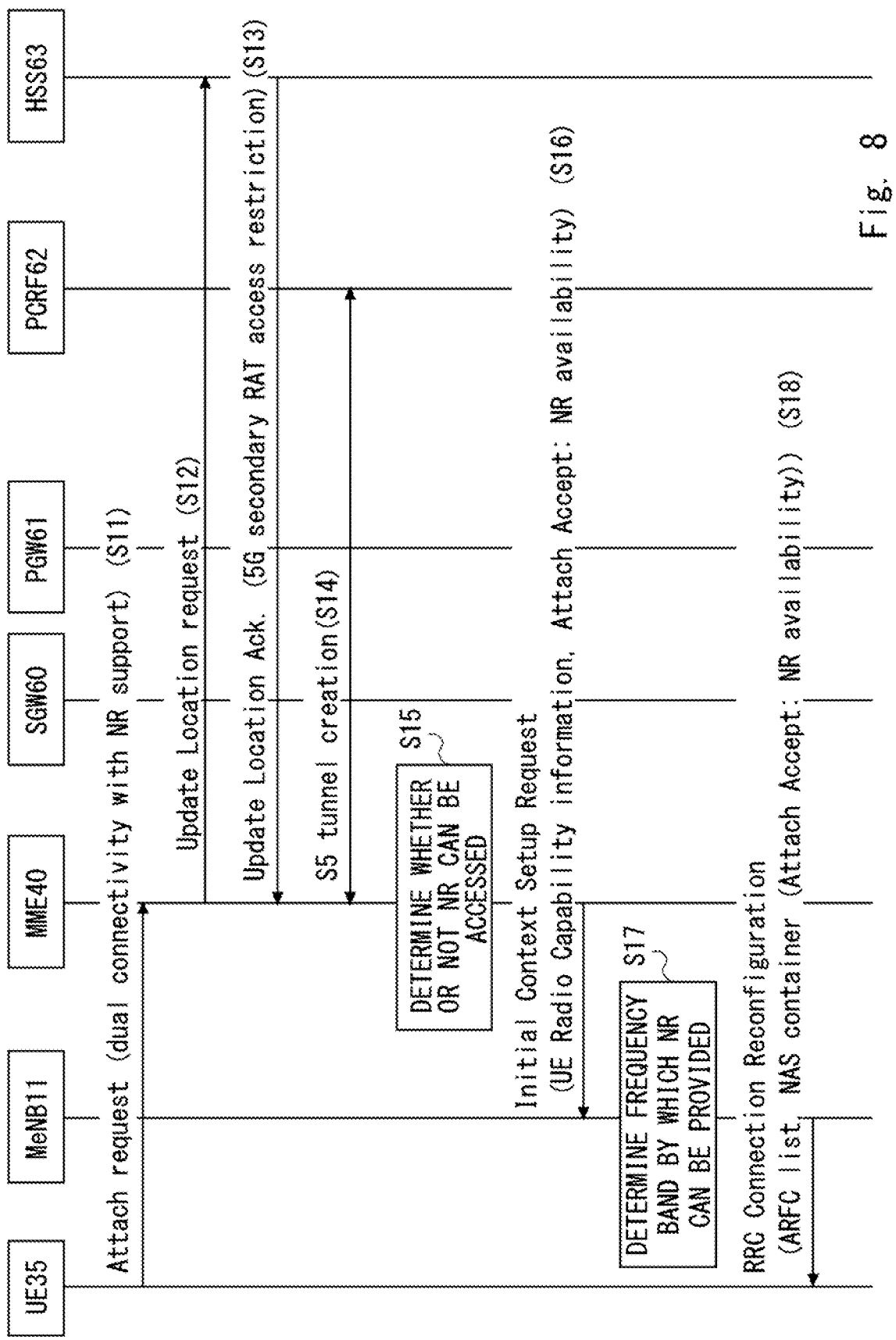
FIG. 8 is a diagram for explaining a process for specifying a frequency band according to a fourth example embodiment.

Next, a flow of processes for specifying a frequency band (or a carrier frequency) that is used for communication using NR according to a fourth example embodiment will be described with reference to FIG. 8. In FIG. 8, a flow of processes performed in a communication system that is obtained by adding an SGW 60 and a PGW 61 both of which transmit U-Plane data, a PCRF 62 that manages policy information, and an HSS 63 that manages subscriber information of UEs in the communication system shown in FIG. 2 will be described. FIG. 8 shows a flow of an Attach process for a UE 35.

Firstly, the UE 35 transmits an Attach request message to the MME 40 through the MeNB 11 (S11). The Attach request message includes information indicating that the UE 35 can perform DC using NR (as the secondary RAT). The information indicating that the UE 35 can perform DC using NR (as the secondary RAT) may be, for example, handled as a parameter included in the Attach request message and referred to as dual connectivity with NR support or EN-DC support. The fact that the UE 35 can perform DC using NR (as the secondary RAT) may also be expressed as that the UE 35 supports a frequency band (or a carrier frequency) that is necessary to perform communication using NR (as the secondary RAT) (i.e., supports simultaneous use of that frequency band (or that carrier frequency) with a frequency band of the LTE service cell).

Next, the MME 40 transmits an Update Location request message to the HSS 63 (S12). Next, the HSS 63 transmits an Update Location Ack message to the MME 40 as a response message to the Update Location request message. The HSS 63 includes a 5G secondary RAT access restriction in the Update Location Ack message. The 5G secondary RAT access restriction is information indicating whether or not there is a restriction for the use of NR as the secondary RAT when the UE 35 performs DC. The HSS 63 holds, as subscriber information, information indicating whether or not there is a restriction for the use of NR as the secondary RAT by the UE 35. Further, when the HSS 63 receives an Update Location request message including information indicating that the UE 35 can perform DC using NR, it may transmit an Update Location Ack message including a 5G secondary RAT access restriction.

Next, a process for setting an S5 tunnel between the SGW 60 and the PGW 61 is performed among the MME 40, the SGW 60, the PGW 61, and the PCRF 62 (S5 tunnel creation) (S14).

Next, the MME 40 determines whether or not there is a restriction that prevents the UE 35 from using NR (S15). The MME 40 determines whether or not there is a restriction that prevents the UE 35 from using NR by checking the 5G secondary RAT access restriction included in the Update Location Ack message received in the step S13.

Next, the MME 40 transmits an Initial Context Setup Request message to the MeNB 11 (S16). The MME 40 includes UE Radio Capability information in the Initial Context Setup Request message. The UE Radio Capability information is information about at least one frequency band that the UE 35 can use for radio communication. In other words, the UE Radio Capability information is information about at least one frequency band that the UE 35 supports to perform radio communication. For example, the UE 35 may include the information about at least one frequency band that the UE 35 supports to perform radio communication in, for example, the Attach request message in the step S11.

Further, the MME 40 transmits an Initial Context Setup Request message to the MeNB 11 (S16). The Initial Context Setup Request message includes an Attach Accept message. The Attach Accept message is a message that is terminated in the UE 35. Specifically, the Attach Accept message is a NAS message. That is, the Attach Accept message included in the Initial Context Setup Request message (S16) is, by the MeNB 11, transparently included in an RRC message as NAS information (e.g., NAS PDU) and transmitted to the UE 35. The RRC Connection Reconfiguration message (S18) may be a message that carries the Attach Accept message. Note that when the MME 40 determines that there is no restriction that prevents the UE 35 from using NR as the secondary RAT in the step S15, the MME 40 includes information indicating that the use of NR as the secondary RAT is permitted (i.e., NR availability) in the Attach Accept message.

Next, the MeNB 11 determines a frequency band (or a carrier frequency) of the NR that can be provided to the UE 35 by using the UE Radio Capability information and the information about the frequency band of the NR supported by the SgNB that cooperates with the MeNB 11 when they perform DC (S17). The frequency band of the NR supported by the SgNB that cooperates with the MeNB 11 when they perform DC is, for example, a frequency band (or a carrier frequency) supported by the SgNB that has already set up an X2-C as a reference point between the SgNB and the MeNB 11 or other MeNBs in a TA (Tracking Area) in which the UE 35 is registered. That is, the MeNB 11 also holds information about frequency bands supported by the SgNB that cooperates with the other MeNB when they provide DC. For example, the MeNB 11 may receive information about the frequency bands supported by the SgNB that cooperates with the other MeNB when they provide DC from other eNBs connected to the MeNB 11 through an X2-C or X2 reference point.

For example, the MeNB 11 may determine, as the frequency band (or the carrier frequency) of NR that the MeNB 11 can provide to the UE 35, a frequency band (or a carrier frequency) that is included in both the frequency bands (or the carrier frequencies) indicated in the UE Radio Capability information and the frequency bands (or the carrier frequencies) supported by the SgNB when it performs DC.

Next, the MeNB 11 transmits an RRC Connection Reconfiguration message to the UE 35 (S18). The MeNB 11 transmits, by using an RRC Connection Reconfiguration message, the Attach Accept message in which the information about the frequency band of NR that the MeNB 11 can provide to the UE 35 and the information indicating that the use of NR as the secondary RAT is permitted (i.e., the NR availability) are included as NAS information (e.g., NAS PDU). Further, the MeNB 11 may transmit, by using the RRC Connection Reconfiguration message, information about the frequency band of NR that the MeNB 11 can provide to the UE 35 to the UE 35. This information may be shown as frequency bands (FBIs) or carrier frequencies (ARFCNs), or as a list thereof.

The core network may register (the position of) the UE 35 for a plurality of TAs. In other words, (the position of) the UE 35 may be registered for a plurality of TAs. In this case, the core network (e.g., the MME) and the UE 35 may store the plurality of TAs in the form of a TA list (a TAI (Tracking Area Identity) List). In this case, the MME may notify the MeNB 11 of the TA list of the UE 35 by using an S1AP message (e.g. an Initial Context Setup Request). The MeNB 11 may include information about the frequency bands of NR that the MeNB 11 can provide to the UE 35 for each TA included in the TA list. Note that the TA list may be transmitted from the UE 35 to the MeNB 11 by using an RRC message.

Figure 9:
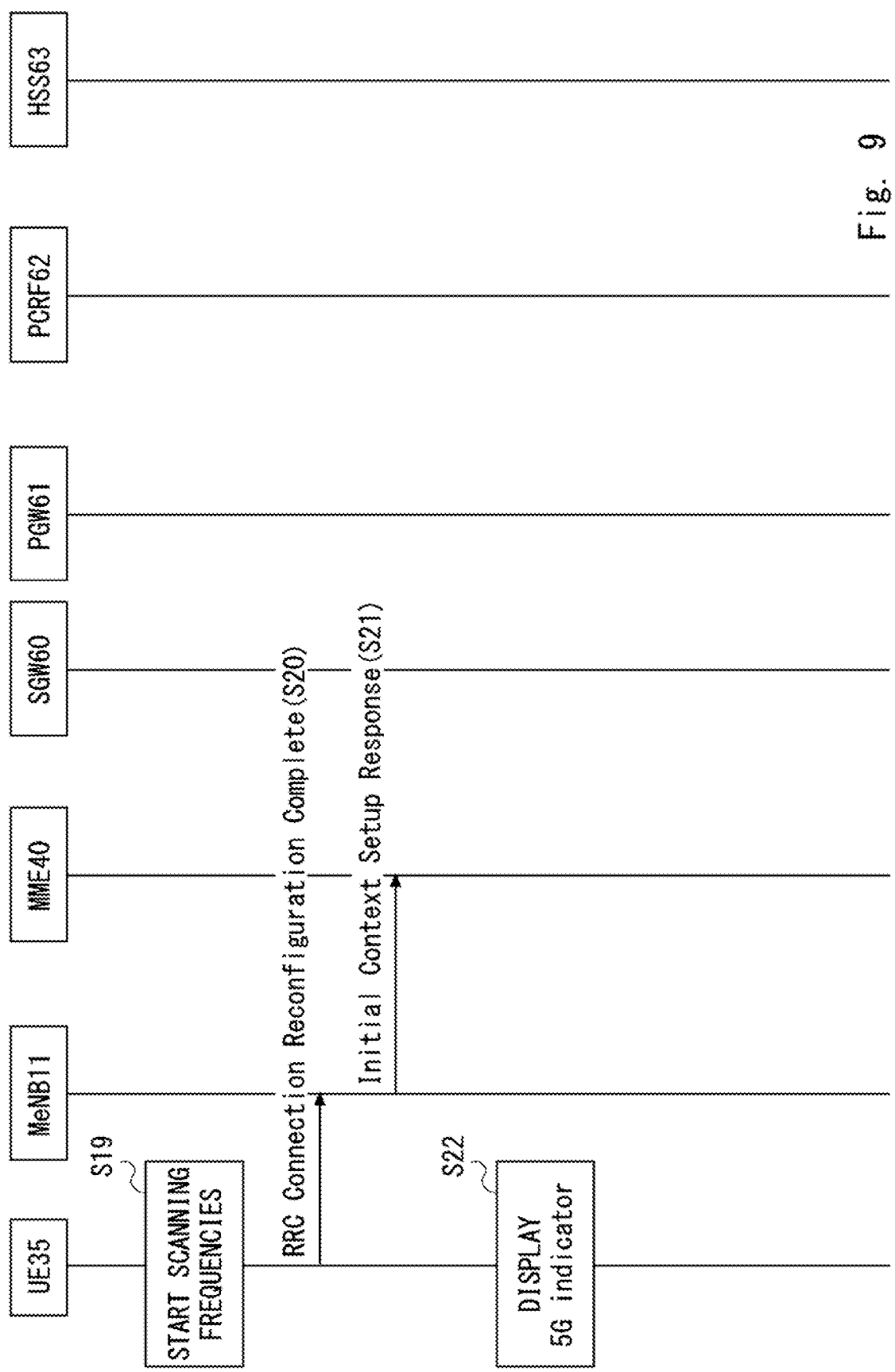
FIG. 9 is a diagram for explaining a process for specifying a frequency band according to the fourth example embodiment.

Next, referring to FIG. 9, when the NR availability is included in the Attach Accept message and the UE 35 receives the information about the frequency bands of NR that can be provided to the UE 35, the UE 35 starts scanning the frequency bands of the NR that can be provided to the UE 35 (S19). For example, upon receiving the NAS information, the NAS layer of the UE 35 may instruct (trigger) the AS layer (e.g., RRC) of the UE 35 to start scanning. Note that it may be determined whether or not to perform the scanning according to whether or not the AS layer of the UE 35 has also already received the information about the frequency bands of NR.

Next, the UE 35 transmits an RRC Connection Reconfiguration Complete message to the MeNB 11 in response to the RRC Connection Reconfiguration message received in the step S18 (S20). Next, the MeNB 11 transmits an Initial Context Setup Response message to the MME 40 in response to the Initial Context Setup Request message received in the step S16 (S21).

In the above description given with reference to FIG. 9, the UE 35 transmits the RRC Connection Reconfiguration Complete message to the MeNB 11 after it starts the scanning of the frequency bands of NR that can be provided to the UE 35. However, the UE 35 may start the scanning of the frequency bands of NR that can be provided to the UE 35 after it transmits the RRC Connection Reconfiguration Complete message to the MeNB 11.

Next, the communication unit 31 included in the UE 35 scans the frequency bands of NR that can be provided to the UE 35. Then, when the communication unit 31 (the RRC Layer) can detect a signal in any of the frequency bands, it notifies the control unit 32 (the NAS layer, i.e., an upper layer with respect to the RRC layer) that a 5G service is available. Further, when the communication unit 31 (the RRC Layer) can detect no signal in any of the frequency bands, it notifies the control unit 32 (the NAS layer, i.e., an upper layer with respect to the RRC Layer) that a 5G service is not available. Further, this notification may be provided only when a signal that has been able to be detected becomes impossible to be detected any longer, or when a signal that has not been able to be detected starts to be detected (i.e., only when the situation has changed). In this way, the UE 35 controls the display of the 5G indicator based on this notification.

As described above, in the Attach process for the UE 35, the MeNB 11 according to the fourth example embodiment can transmit, to the UE 35, information including information about the frequency bands supported by an SgNB which can provide DC in cooperation with the MeNB 11, or an SgNB which can provide DC in cooperation with other MeNBs.

The UE 35 receives, from the MeNB 11, information about a plurality of frequency bands or all of the frequency bands that are used when DC is performed from the MeNB 11 in the TA. Therefore, when the UE 35 moves within the TA, it can determine (or recognize) whether or not it can perform DC using NR as the secondary RAT (or whether or not it is in a state in which it can perform the DC) without newly receiving information about the frequency bands of NR from the MeNB that forms the communication area (a cell or the like) at the destination. Accordingly, in the UE 35, it is possible to determine whether or not a 5G (NR) system is available, and when it is available, to display a 5G indicator in the display unit of the UE 35. Further, in the case where the UE 35 has already received information about frequency bands of NR by which it can perform DC using the NR as the secondary RAT for each TA included in the TA list, the UE 35 can determine (or recognize) whether or not it can perform the DC using the NR as the secondary RAT (or whether or not it is in a state in which it can perform the DC) without newly receiving information about the frequency bands of NR even after the TA is changed (selected again).

Further, although a configuration using an EPC as a core network has been described in each of the second to fourth example embodiments, a 5GC (a 5G Core) may be used as the core network. An example of a configuration of a communication system in which a 5GC is used will be described with reference to FIG. 10. DC provided to the UE 35 by using the configuration shown in FIG. 10 may also be referred to as NG-EN-DC.

Figure 10:
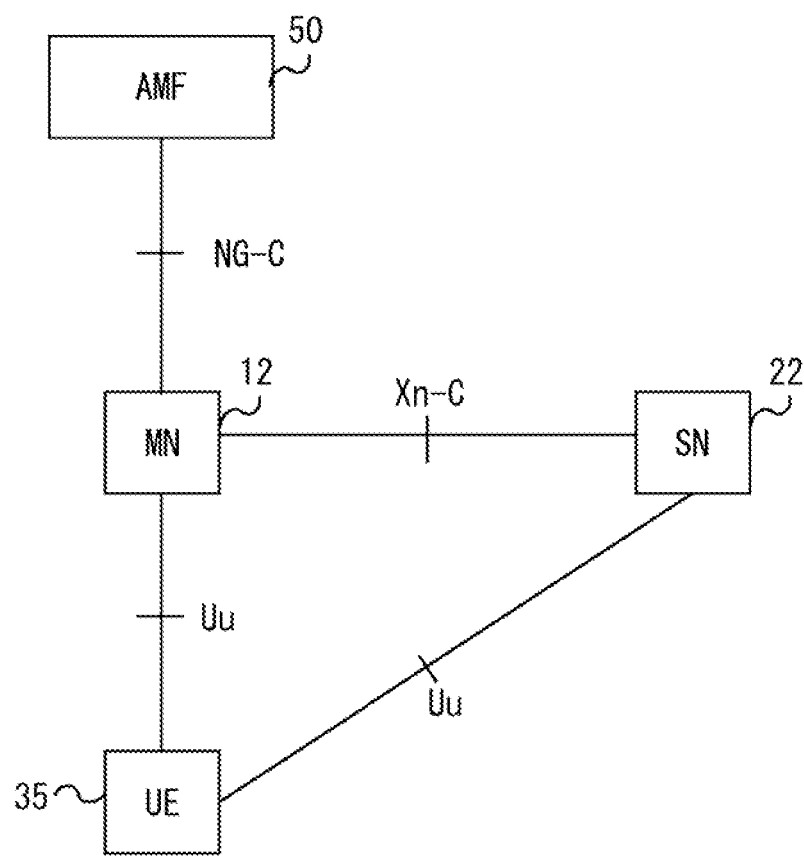
FIG. 10 is a configuration diagram of a communication system according to each example embodiment.

The communication system shown in FIG. 10 includes an AMF 50, a UE 35, an MN (Master Node) 12, and an SN (Secondary Node) 22. Since the UE 35 is the same as that shown in FIG. 3, its detailed description is omitted.

The AMF 50 is a core network apparatus or a core network node that constitutes a 5GC. The AMF 50 controls mobility of the UE 35.

The MN 12 is a node corresponding to the MeNB 11. The MN 12 is a name that is used as a name of a node apparatus indicating the MeNB 11 when the 5GC is used as the core network. That is, the MN 12 may be replaced by the MeNB 11. The SN 22 is a node corresponding to the SgNB 21. The SN 22 is a name that is used as a name of a node apparatus indicating the SgNB 21 when the 5GC is used as the core network. That is, the SN 22 may be replaced with the SgNB 21.

A Uu is defined as a reference point between the UE 35 and the MN 12. A Uu is defined as a reference point between the UE 22 and the SN 35. An Xn-C is defined as a reference point between the MN 12 and the SN 22. An NG-C (or N2) is defined as a reference point between the MN 12 and the AMF 50. The S1AP message described in the above-described example embodiments (or a similar message) may be defined as an NGAP message (or an N2AP message).

Figure 11:
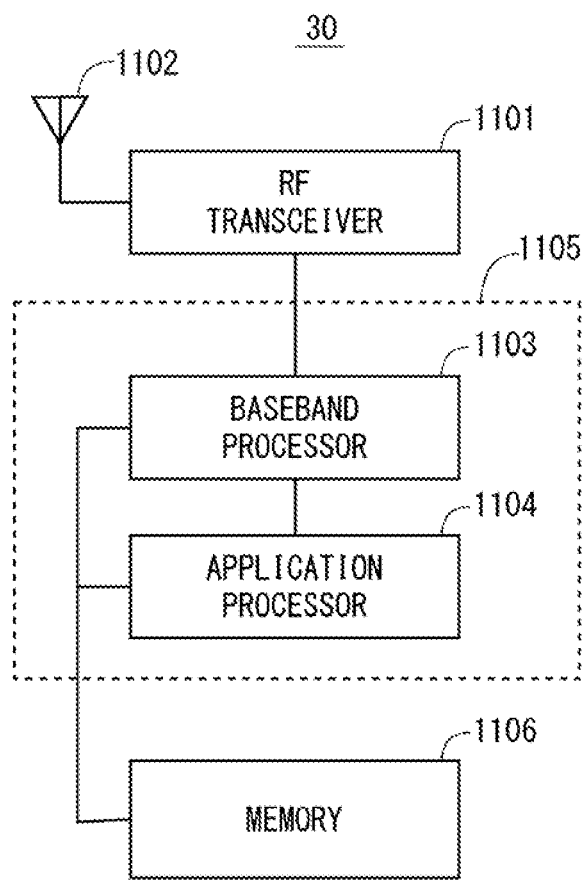
FIG. 11 is a configuration diagram of an MeNB according to each example embodiment.

Next, configuration examples of the MeNB 11 and the communication terminal 30, which are explained in the above-described plurality of example embodiments, are explained hereinafter. FIG. 11 is a block diagram showing a configuration example of the MeNB 11. As shown in FIG. 11, the MeNB 11 includes an RF transceiver 1001, a network interface 1003, a processor 1004, and a memory 1005. The RF transceiver 1001 performs an analog RF signal process in order to communicate with UEs. The RF transceiver 1001 may include a plurality of transceivers. The RF transceiver 1001 is connected to an antenna 1002 and the processor 1004. The RF transceiver 1001 receives modulation symbol data (or OFDM symbol data) from the processor 1004, generates a transmission RF signal, and supplies the generated transmission RF signal to the antenna 1002. Further, the RF transceiver 1001 generates a baseband reception signal based on a reception RF signal received through the antenna 1002 and supplies the generated baseband reception signal to the processor 1004.

The network interface 1003 is used for communication with a network node (e.g., other center nodes). The network interface 1003 may include, for example, a network interface card (NIC) in conformity with IEEE 802.3 series.

The processor 1004 performs a data-plane process including a digital baseband signal process for radio communication and a control-plane process. For example, in the case of LTE or 5G, the digital baseband signal process performed by the processor 1004 may include signal processes in a MAC layer and a PHY layer.

The processor 1004 may include a plurality of processors. For example, the processor 1004 may include a modem-processor (e.g., a DSP) that performs a digital baseband signal process and a protocol-stack-processor (e.g., a CPU or an MPU) that performs a control-plane process.

The memory 1005 is formed by a combination of a volatile memory and a nonvolatile memory. The memory 1005 may include a plurality of physically-independent memory devices. The volatile memory is, for example, a Static Random Access Memory (SRAM), a Dynamic RAM (DRAM), or a combination thereof. The nonvolatile memory is, for example, a Read Only Memory (MROM), an Electrically Erasable Programmable ROM (EEPROM), a flash memory, a hard disk drive, or a combination thereof. The memory 1005 may include a storage disposed apart from the processor 1004. In this case, the processor 1004 may access the memory 1005 through the network interface 1003 or an I/O interface (not shown).

The memory 1005 may store a software module (a computer program) including a group of instructions and data for performing processes performed by the MeNB 11 explained in the above-described plurality of example embodiments. In some implementations, the processor 1004 may be configured so that it performs processes performed by the MeNB 11 explained in the above-described example embodiments by reading the software module from the memory 1005 and executing the read software module.

Figure 12:
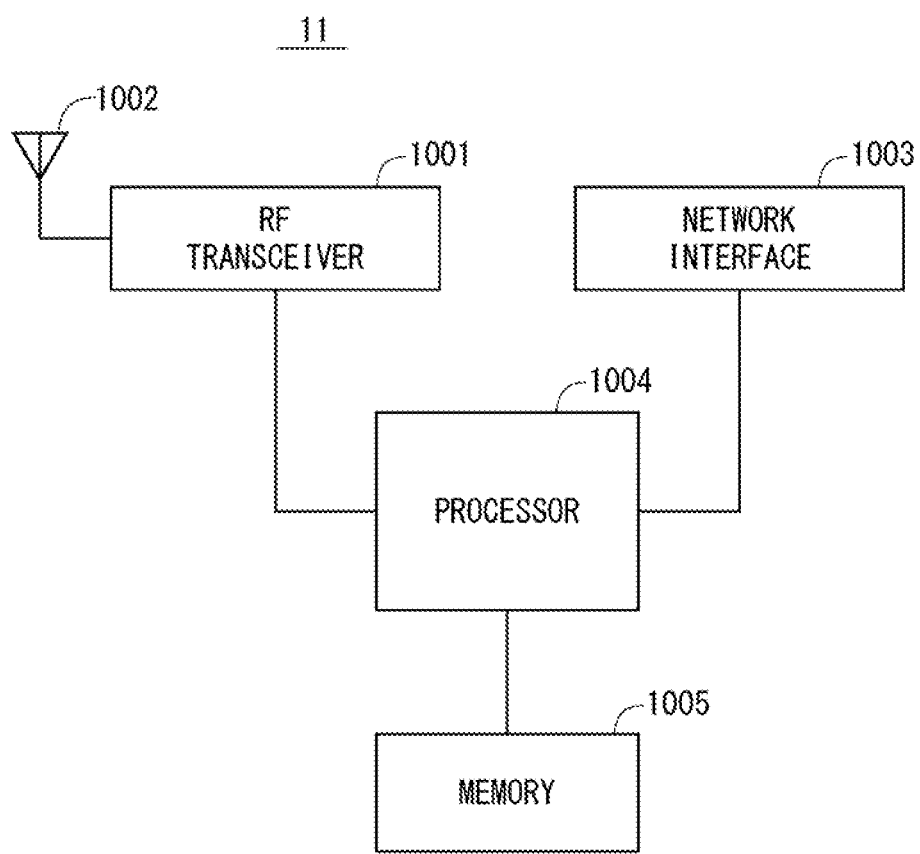
FIG. 12 is a configuration diagram of a communication terminal according to each example embodiment.

FIG. 12 is a block diagram showing a configuration example of the communication terminal 30. A Radio Frequency (RF) transceiver 1101 performs an analog RF signal process in order to communicate with the eNB 60. The analog RF signal process performed by the RF transceiver 1101 includes a frequency up-conversion, a frequency down-conversion, and amplification. The RF transceiver 1101 is connected to an antenna 1102 and a baseband processor 1103. That is, the RF transceiver 1101 receives modulation symbol data (or OFDM symbol data) from the baseband processor 1103, generates a transmission RF signal, and supplies the generated transmission RF signal to the antenna 1102. Further, the RF transceiver 1101 generates a baseband reception signal based on a reception RF signal received through the antenna 1102 and supplies the generated baseband reception signal to the baseband processor 1103.

The baseband processor 1103 performs a digital baseband signal process for radio communication (a data-plane process) and a control-plane process. The digital baseband signal process includes (a) data compression/restoration, (b) data segmentation/concatenation, (c) transmission format (transmission frame) generation/decomposition, (d) transmission path encoding/decoding, (e) modulation (symbol mapping), (f) OFDM symbol data (baseband OFDM signal) generation by Inverse Fast Fourier Transform (IFFT), and so on. Meanwhile, the control-plane process includes communication management in a layer 1 (e.g., transmission power control), a layer 2 (e.g., radio resource management and a hybrid automatic repeat request (HARQ)), and a layer 3 (e.g., attach, mobility, and signaling related to telephone-call management).

For example, in the case of LTE or 5G, the digital baseband signal process performed by the baseband processor 1103 may include signal processes in a Packet Data Convergence Protocol (PDCP) layer, a Radio Link Control (RLC) layer, a MAC layer, and a PHY layer. Further, the control-plane process performed by the baseband processor 1103 may include a Non-Access Stratum (NAS) protocol, an RRC protocol, and a MAC CE process.

The baseband processor 1103 may include a modem-processor (e.g., a Digital Signal Processor (DSP)) that performs a digital baseband signal process and a protocol-stack-processor (e.g., a Central Processing Unit (CPU), or a Micro Processing Unit (MPU)) that performs a control-plane process. In this case, the same processor (i.e., one processor) may be used as both the aforementioned protocol-stack-processor that performs a control-plane process and a later-described application processor 1104.

The application processor 1104 is also referred to as a CPU, an MPU, a microprocessor, or a processor core. The application processor 1104 may include a plurality of processors (or a plurality of processor cores). The application processor 1104 implements various functions of the communication terminal 30 by executing a system software program (Operating System (OS)) and various application programs read from a memory 1106 or other memories (not shown). The application program may be, for example, a telephone-call application, a WEB browser, a mailer, a cameral operation application, and a music playback application.

In some implementations, the baseband processor 1103 and the application processor 1104 may be integrally disposed (or formed) on one semiconductor chip as indicated by broken lines (1105) in FIG. 12. In other words, the baseband processor 1103 and the application processor 1104 may be implemented as one System on Chip (SoC) device 1105. The SoC device may also be called a system LSI (Large Scale Integration) or a chip set.

The memory 1106 is a volatile memory, a nonvolatile memory, or a combination thereof. The memory 1106 may include a plurality of physically-independent memory devices. The volatile memory is, for example, a Static Random Access Memory (SRAM), a Dynamic RAM (DRAM), or a combination thereof. The nonvolatile memory is, for example, a Read Only Memory (MROM), an Electrically Erasable Programmable ROM (EEPROM), a flash memory, a hard disk drive, or a combination thereof. For example, the memory 1106 may include an external memory device that can be accessed by the baseband processor 1103, the application processor 1104, and the SoC 1105. The memory 1106 may include an internal memory device integrally disposed (or formed) in the baseband processor 1103, the application processor 1104, or the SoC 1105. Further, the memory 1106 may include a memory disposed in a Universal Integrated Circuit Card (UICC).

The memory 1106 may store a software module (a computer program) including a group of instructions and data for performing processes performed by the communication terminal 30 explained in the above-described plurality of example embodiments. In some implementations, the baseband processor 1103 or the application processor 1104 may be configured so that it performs processes performed by the communication terminal 30 explained in the above-described example embodiments by reading the software module from the memory 1106 and executing the read software module.

In the above-described examples, the program can be stored and provided to a computer using any type of non-transitory computer readable media. Non-transitory computer readable media include any type of tangible storage media. Examples of non-transitory computer readable media include magnetic storage media, optical magnetic storage media, CD-ROM (compact disc read only memory), CD-R, CD-R/W, and semiconductor memories. Examples of the magnetic storage media include flexible disks, magnetic tapes, and hard disk drives. Examples of the optical magnetic storage media include magneto-optical disks. Examples of the semiconductor memories include mask ROM, PROM (programmable ROM), EPROM (Erasable PROM), flash ROM, and RAM (random access memory). Further, the program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Other Example Embodiments

Note that the present disclosure is not limited to the above-described example embodiments and can be modified as appropriate without departing from the spirit and scope of the present disclosure. Further, the present disclosure may be implemented by combining the above-described example embodiments with one another. For example, the above-described example embodiments are described for the cases where dual connectivity (DC) in which a communication terminal simultaneously communicates with a master base station and a secondary base station each of which is associated with a specific radio access technology (RAT) is used. However, the present disclosure is not limited to the DC. For example, the present disclosure may be applied to the case where a communication terminal (UE) performs carrier aggregation (CA) of a cell of a master base station (e.g., an LTE eNB) and a cell of a secondary base station (e.g., an NR gNB). In this case, information indicating that use of NR as s secondary RAT is permitted (i.e., NR availability) may indicate that use of a cell of NR as a secondary cell is permitted. Additionally or alternatively, other information indicating that use of a cell of NR as a secondary cell is permitted (e.g. NR availability for CA) may be transmitted from the core network (e.g., the MME) or the base station (e.g., the master base station) to the communication terminal (the UE).

Although the invention of the present application is explained above with reference to example embodiments, the invention of the present application is not limited to the above-described example embodiments. Various modifications that can be understood by those skilled in the art can be made to the configuration and details of the invention of the present application within the scope of the invention.

The whole or part of the example embodiments disclosed above can be described as, but not limited to, the following supplementary notes.

(Supplementary Note 1)
A communication terminal comprising:
communication means for simultaneously communicating with a master base station associated with a first radio access technology and a secondary base station associated with a second radio access technology;
reception means for receiving, from the master base station, information indicating that use of dual connectivity using the second radio access technology is permitted; and
control means for specifying at least one frequency band supported by the secondary base station, the secondary base station being configured to provide dual connectivity in cooperation with the master base station.

(Supplementary Note 2)
The communication terminal described in Supplementary note 1, wherein when the control means specifies the at least one frequency band, it determines whether or not to display information indicating that the second radio access technology can be used in the display means.

(Supplementary Note 3)
The communication terminal described in Supplementary note 2, wherein when the control means specifies the at least one frequency band and receives, from the master base station, information indicating that the master base station can support dual connectivity using a locally-available second radio access technology, the control means displays the information indicating that the second radio access technology can be used in the display means.

(Supplementary Note 4)
The communication terminal described in Supplementary note 1, wherein the control means scans frequency bands supported by the communication terminal and specifies the at least one frequency band based on a frequency band by which information is normally received from the secondary base station.

(Supplementary Note 5) The communication terminal described in any one of Supplementary notes 1 to 4, wherein the control means receives, from the master base station, information about the at least one frequency band supported by the secondary base station, which is configured to provide dual connectivity in cooperation with the master base station, and specifies an available frequency band by scanning frequency bands included in the received information.

(Supplementary Note 6)
The communication terminal described in Supplementary note 5, wherein the control means receives, from the master base station, a SIB (System Information Block) including information about the at least one frequency band supported by the secondary base station.

(Supplementary Note 7)
The communication terminal described in Supplementary note 5 or 6, wherein the control means receives, from the master base station, information about a combination of the at least one frequency band supported by the secondary base station, which is configured to provide dual connectivity in cooperation with the master base station, and a frequency band that the master base station uses for communication with the communication terminal.

(Supplementary Note 8)
The communication terminal described in Supplementary note 6, wherein when the control means receives information indicating that use of dual connectivity using the second radio access technology is permitted in a NAS (Non Access Stratum) layer, the control means makes the NAS layer instruct an RRC (Radio Resource Control) layer to scan at least one frequency band included in the SIB.

(Supplementary Note 9)
The communication terminal described in any one of Supplementary notes 1 to 5, wherein the control means receives, from the master base station, information about at least one frequency band supported by a secondary base station, the secondary base station being configured to provide dual connectivity in cooperation with the master base station or another master base station in at least one location registration area in which the communication terminal is registered.

(Supplementary Note 10)
The communication terminal described in Supplementary note 9, wherein in a location registration process, the control means receives, from the master base station, a message in which information about the at least one frequency band supported by the secondary base station is set.

(Supplementary Note 11)
The communication terminal described in Supplementary note 10, wherein the control means scans the at least one frequency band set in the message received in the location registration process and thereby specifies an available frequency band.

(Supplementary Note 12)
The communication terminal described in Supplementary note 11, wherein when the control means receives information indicating that use of dual connectivity using the second radio access technology is permitted in a NAS layer, the control means makes the NAS layer instruct an RRC layer to scan the at least one frequency band set in the message received in the location registration process.

(Supplementary Note 13)
The communication terminal described in any one of Supplementary notes 1 to 12, wherein the control means receives, from the master base station, identification information for identifying at least one secondary base station, the at least one secondary base station being configured to provide dual connectivity in cooperation with the master base station, and
when identification information of the secondary base station included in a signal transmitted from the secondary base station is included in the identification information for identifying the at least one secondary base station received from the master base station, the control means specifies the at least one frequency band supported by the secondary base station, which is configured to provide dual connectivity in cooperation with the master base station.

(Supplementary Note 14)

The communication terminal described in any one of Supplementary notes 1 to 12, wherein when identification information of the master base station to which the communication terminal currently belongs is included in identification information that is included in a signal transmitted from the secondary base station and is for identifying at least one master base station that provides dual connectivity in cooperation with the secondary base station, the control means specifies the at least one frequency band supported by the secondary base station, which is configured to provide dual connectivity in cooperation with the master base station.

(Supplementary Note 15)

A base station comprising:
communication means for communicating with a communication terminal by using a first radio access technology; and
control means for transmitting, to the communication terminal, information about at least one frequency band supported by a secondary base station associated with the second radio access technology when the base station provides dual connectivity to the communication terminal in cooperation with the secondary base station.

(Supplementary Note 16)

The base station described in Supplementary note 15, wherein the control means transmits, to the communication terminal, an SIB including information about the at least one frequency band supported by the secondary base station.

(Supplementary Note 17)

The base station described in Supplementary note 15, wherein the control means transmits, in at least one location registration area in which the communication terminal is registered, information about the at least one frequency band supported by the secondary base station, the secondary base station being configured to provide dual connectivity in cooperation with the base station or another master base station.

(Supplementary Note 18)

The base station described in Supplementary note 17, wherein in a location registration process, the control means transmits, to the communication terminal, a message in which information about the at least one frequency band supported by the secondary base station is set.

(Supplementary Note 19)

The base station described in any one of Supplementary notes 15 to 18, wherein the control means transmits, to the communication terminal, identification information for identifying at least one secondary base station, the at least one secondary base station being configured to provide dual connectivity in cooperation with the base station.

(Supplementary Note 20)

A base station comprising:
communication means for communicating with a communication terminal by using a second radio access technology; and
control means for transmitting, to the communication terminal, identification information for identifying at least one master base station associated with a first radio access technology, the at least one master base station being configured so as to be able to provide dual connectivity in corporation with the base station.

(Supplementary Note 21)

A communication method performed in a communication terminal, the communication terminal being configured to simultaneously communicate with a master base station associated with a first radio access technology and a secondary base station associated with a second radio access technology, the communication method comprising:
receiving, from the master base station, information indicating that use of dual connectivity using the second radio access technology is permitted; and
specifying at least one frequency band supported by the secondary base station, the secondary base station being configured to provide dual connectivity in cooperation with the master base station.

(Supplementary Note 22)

A communication method performed in a base station, the base station being configured to communicate with a communication terminal by using a first radio access technology, the communication method comprising:
transmitting, to the communication terminal, information about at least one frequency band supported by a secondary base station associated with a second radio access technology when the base station provides dual connectivity to the communication terminal in cooperation with the secondary base station.

REFERENCE SIGNS LIST

10 MASTER BASE STATION
11 MeNB
12 MN
15 CONTROL UNIT
16 COMMUNICATION UNIT
20 SECONDARY BASE STATION
21 SgNB
22 SN
30 COMMUNICATION TERMINAL
31 COMMUNICATION UNIT
32 CONTROL UNIT
35 UE
40 MME
50 AMF
63 HSS

The invention claimed is:

1. A communication terminal comprising:
at least one memory storing instructions, and
at least one processor configured to execute the instructions to:
receive, from a core network node via a master radio access network (RAN) node providing a first radio access technology, a Non Access Stratum (NAS) message including first information indicating that use of dual connectivity using a second radio access technology is permitted;
receive, from the master RAN node, second information including one or more frequency bands corresponding to the second radio access technology and used for dual connectivity with a serving cell associated with the master RAN node; and
indicate that the communication terminal has entered a coverage area associated with the second radio access technology provided by a secondary RAN node.

2. The communication terminal according to claim 1, wherein the at least one processor is configured to execute the instructions to indicate that the communication terminal has entered a coverage area associated with the second radio access technology in response to the second information and if the communication terminal supports to operate dual connectivity using the serving cell and at least one of frequency bands in the second information.

3. The communication terminal according to claim 1, wherein the at least one processor is further configured to execute the instructions to display third information indicating that the second radio access technology can be used.

4. The communication terminal according to claim 1, wherein the second information corresponds to a System Information Block (SIB).

5. A master radio access network (RAN) node providing a first radio access technology, the master RAN node comprising:
  at least one memory storing instructions, and
  at least one processor configured to execute the instructions to:
  transmit, to a communication terminal, a Non Access Stratum (NAS) message received from a core network node and including first information indicating the communication terminal is permitted to use dual connectivity using a second radio access technology, and
  transmit, to the communication terminal, second information including one or more frequency bands corresponding to the second radio access technology and used for dual connectivity with a serving cell associated with the master RAN node,
  wherein the second information is used to indicate that the communication terminal has entered a coverage area associated with the second radio access technology provided by a secondary RAN node.

6. The master RAN node according to claim 5, wherein the second information corresponds to a System Information Block (SIB).

7. A method for a communication terminal, the method comprising:
  receiving, from a core network node via a master radio access network (RAN) node providing a first radio access technology, a Non Access Stratum (NAS) message including first information indicating that use of dual connectivity using a second radio access technology is permitted;
  receiving, from the master RAN node, second information including one or more frequency bands corresponding to the second radio access technology and used for dual connectivity with a serving cell associated with the master RAN node; and
  indicating that the communication terminal has entered a coverage area associated with the second radio access technology provided by a secondary RAN node.

8. The method according to claim 7, wherein the indicating is performed in response to the second information and if the communication terminal supports to operate dual connectivity using the serving cell and at least one of frequency bands in the second information.

9. The method according to claim 7 further comprising:
  displaying third information indicating that the second radio access technology can be used.

10. The method according to claim 7, wherein the second information corresponds to a System Information Block (SIB).

11. A method for a master radio access network (RAN) node providing a first radio access technology, the method comprising:
  transmitting, to a communication terminal, a Non Access Stratum (NAS) message received from a core network node and including first information indicating the communication terminal is permitted to use dual connectivity using a second radio access technology, and
  transmitting, to the communication terminal, second information including one or more frequency bands corresponding to the second radio access technology and used for dual connectivity with a serving cell associated with the master RAN node,
  wherein the second information is used to indicate that the communication terminal has entered a coverage area associated with the second radio access technology provided by a secondary RAN node.

12. The method according to claim 11, wherein the second information corresponds to a System Information Block (SIB).

13. A non-transitory computer-readable storage medium that stores instructions that when executed by a computer enable the computer to implement a method for a communication terminal, the method comprising:
  receiving, from a core network node via a master radio access network (RAN) node providing a first radio access technology, a Non Access Stratum (NAS) message including first information indicating that use of dual connectivity using a second radio access technology is permitted;
  receiving, from the master RAN node, second information including one or more frequency bands corresponding to the second radio access technology and used for dual connectivity with a serving cell associated with the master RAN node; and
  indicating that the communication terminal has entered a coverage area associated with the second radio access technology provided by a secondary RAN node.

14. A non-transitory computer-readable storage medium that stores instructions that when executed by a computer enable the computer to implement a method for a master radio access network (RAN) node providing a first radio access technology, the method comprising:
  transmitting, to a communication terminal, a Non Access Stratum (NAS) message received from a core network node and including first information indicating the communication terminal is permitted to use dual connectivity using a second radio access technology, and
  transmitting, to the communication terminal, second information including one or more frequency bands corresponding to the second radio access technology and used for dual connectivity with a serving cell associated with the master RAN node,
  wherein the second information is used to indicate that the communication terminal has entered a coverage area associated with the second radio access technology provided by a secondary RAN node.

* * * * *